UNITED STATES PATENT OFFICE.

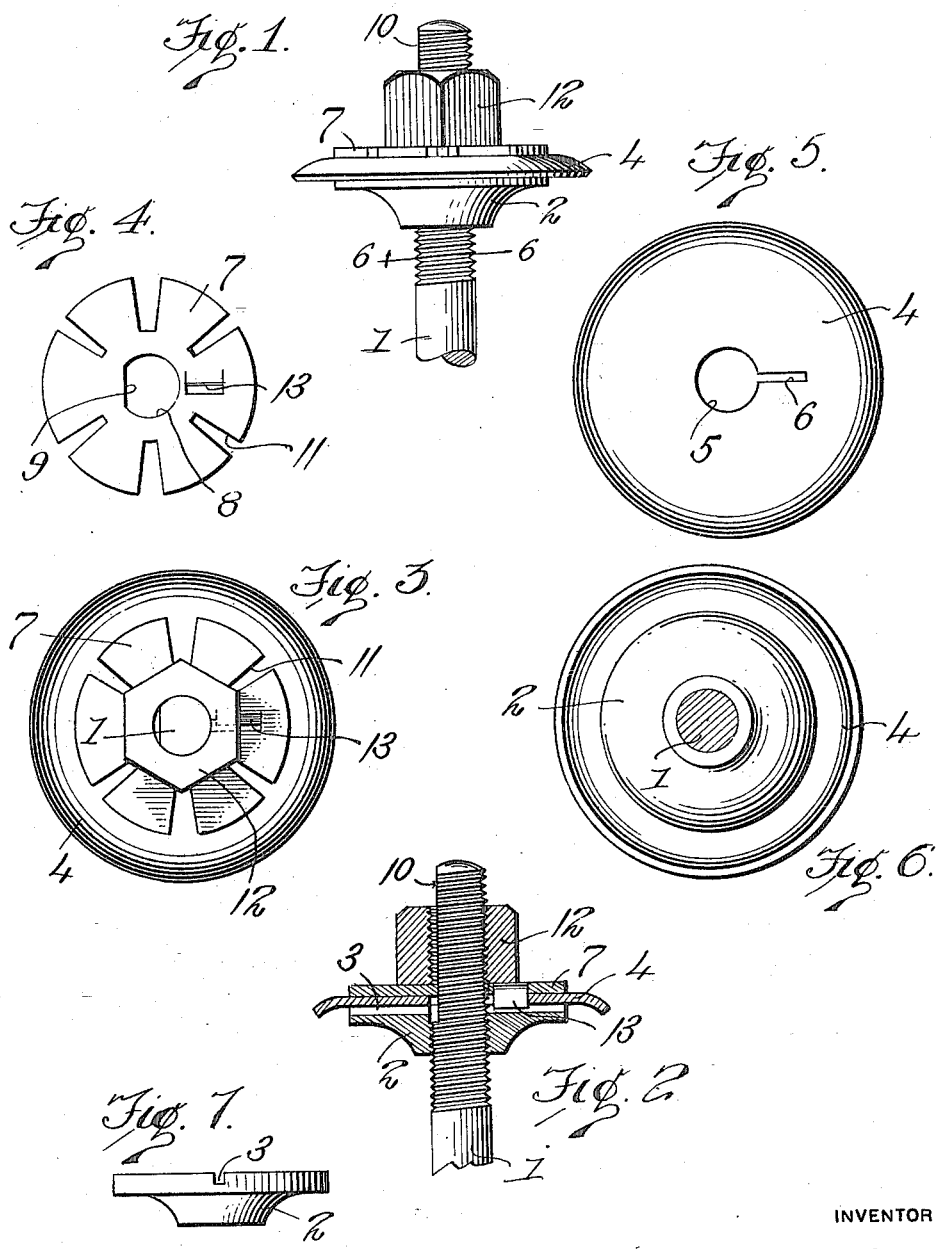

KENNETH McLEOD, OF SEATTLE, WASHINGTON.

NUT-LOCK.

1,216,586. Specification of Letters Patent. Patented Feb. 20, 1917.

Application filed January 13, 1916. Serial No. 71,938.

*To all whom it may concern:*

Be it known that I, KENNETH McLEOD, a citizen of the United States, residing at Seattle, in the county of King and State of Washington, have invented certain new and useful Improvements in Nut-Locks, of which the following is a specification.

This invention relates to an improved means for locking threaded elements upon bolts, studs, or the like, and has for its principal object to provide a locking means especially adapted for locking the cones of ball bearings against turning movement upon a stud.

Another object of the invention is to provide a locking device of this character which is extremely simple in construction and thoroughly reliable and efficient in its operation.

With the foregoing and other objects in view the invention consists in the novel features of construction, combination and arrangement of parts as will be hereinafter more fully described, illustrated in the accompanying drawings and claimed.

In the drawings:

Figure 1 is a side elevation of a stud, cone, dust cap locking washer and nut constructed in accordance with my invention, Fig. 2 is a vertical sectional view therethrough, Fig. 3 is an end elevation, Fig. 4 is a plan view of the locking washer, Fig. 5 is a plan view of the dust cap, Fig. 6 is a sectional view on the line 6—6 of Fig. 1, and Fig. 7 is a side elevation of the cone.

Referring to the drawings by numerals wherein is illustrated the preferred embodiment of my invention, 1 designates a threaded stud, which is engaged by a cone member 2, the said cone member being provided upon its outer face with radially extending grooves 3. A dust cap 4 having a central opening 5 therein is placed over the end of the stud 1 and is engaged with the outer face of the cone 2 in the usual manner. This dust cap is provided with the radially extending slot 6 which opens into the aperture 5 and extends into the body of the cap any suitable distance.

A washer 7 of improved construction is provided with a central opening 8 which is circular in shape throughout the major portion of its extent and has one side thereof formed into a straight wall as indicated at 9, the said straight wall being adapted for engagement with the straight wall 10 of the stud formed by cutting one side of the stud so that when the washer is arranged thereon, its turning movement relative to the stud will be prevented. This washer is provided with a plurality of radially extending slots 11 opening into its outer edge to increase its flexibility and permit of the same being tightly drawn down against the outer face of the dust cap 4 by means of a nut 12 threaded upon the outer end of the stud. A U-shaped slit is formed in the washer 7 and the material of the washer within this slit is bent down to provide a tongue 13. The said tongue being adapted to be passed through the slot 6 in the dust cap 4 and engaged in one of the slots 3 in the outer face of the cone 2. By this construction, it will be seen that by reason of the engagement of the tongue 13 with the slots 6 and 3 in the dust cap and cone, respectively, turning movement of the dust cap or cone relative to the washer is prevented and since turning movement of the washer upon the stud is prevented by reason of the straight walls 9 and 10 being brought into engagement, it will thus be seen that the cone and dust cap are effectually prevented from turning movement upon the stud.

After the cone has been adjusted to a desired position upon the stud, the dust cap is next placed upon the stud in engagement with the outer face of the cone and the washer 7 then engaged with the stud and the tongue 13 thereof alined with the slots 6 and 3 of the dust cap and cone, respectively. The nut 12 is then drawn down in clamping engagement with the outer face of the washer, forcing the dust cap into firm engagement with the cone and thus causing the threads of the cone to bind against the threads of the stud, thereby securely locking the cone upon the stud. It will be understood that the nut lock may be employed either with or without a dust-cap, as desired.

I have designed the present invention for the purpose of utilizing the usual slots in the outer face of the ordinary cone sections of a ball bearing for locking the cone sections in an adjusted position upon a stud, but while the invention has been particularly designed for this purpose, I do not wish to be limited to such use of my invention since it will be obvious that the same may be used for a variety of other purposes and, therefore, I desire it to be understood that I may make such changes in the construction of my invention as fall within the scope of the appended claim.

I claim:

A nut lock comprising the combination with a threaded stud, of a ball bearing member mounted thereon and provided with oppositely extended radial slots in its upper face, a flexible washer slidably mounted upon said stud and provided with a U-shaped incision in its body portion, the material within said incision being bent at an angle to the body of said washer and engaged in one of said slots of the ball bearing member, means for preventing rotation of said washer upon said stud, and a nut threaded upon said stud and engaged with said washer to clamp the same between said nut and said ball bearing member.

In testimony whereof I affix my signature in presence of two witnesses.

KENNETH McLEOD.

Witnesses:
M. E. RICHARDSON,
B. RICHARDSON.

Copies of this patent may be obtained for five cents each, by addressing the "Commissioner of Patents, Washington, D. C."